(No Model.) 2 Sheets—Sheet 1.

J. BARRETT & J. H. WYATT.
TOBACCO POUCH.

No. 596,769. Patented Jan. 4, 1898.

WITNESSES:
C. Nordjord
C. Gerst

INVENTORS:
Joel Barrett &
James H. Wyatt
BY
Edgar Tate & Co.
ATTORNEYS.

(No Model.)  2 Sheets—Sheet 2.

J. BARRETT & J. H. WYATT.
TOBACCO POUCH.

No. 596,769. Patented Jan. 4, 1898.

WITNESSES:
C. Nordfors.
C. Gerst.

INVENTORS:
Joel Barrett
James H. Wyatt.
BY Edgar Tate
ATTORNEYS.

THE NORRIS PETERS CO., PHOTO-LITHO., WASHINGTON, D. C.

UNITED STATES PATENT OFFICE.

JOEL BARRETT AND JAMES H. WYATT, OF WASHINGTON, OHIO.

TOBACCO-POUCH.

SPECIFICATION forming part of Letters Patent No. 596,769, dated January 4, 1898.

Application filed May 22, 1897. Serial No. 637,742. (No model.)

*To all whom it may concern:*

Be it known that we, JOEL BARRETT and JAMES H. WYATT, citizens of the United States, residing at Washington, in the county of Fayette and State of Ohio, have invented certain new and useful Improvements in Tobacco-Pouches, of which the following is a full and complete specification, such as will enable those skilled in the art to which it appertains to make and use the same.

This invention relates to tobacco-pouches; and the object thereof is to provide a tobacco-pouch in the open end of which is secured a metal casing in which is placed a sliding or pivoted receptacle which is adapted to serve as a match-box or other receptacle, said pouch being also filled and the tobacco removed therefrom through said casing.

The invention is fully disclosed in the following specification, of which the accompanying drawings form a part, in which—

Figure 1:
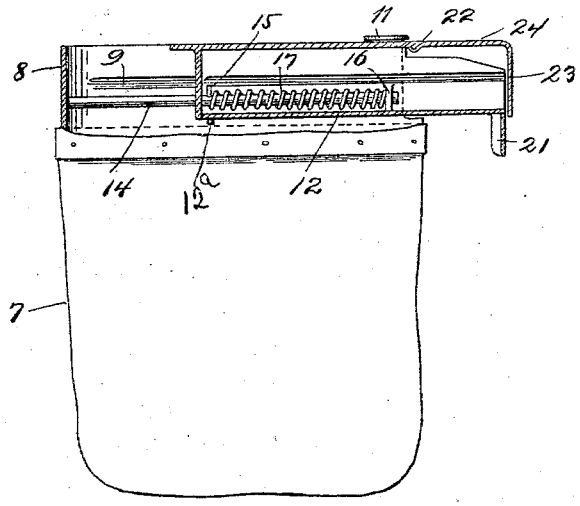
Figure 2:
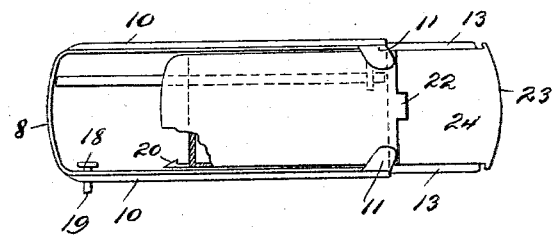
Figure 3:
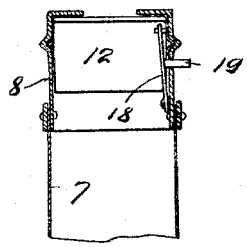
Figure 4:
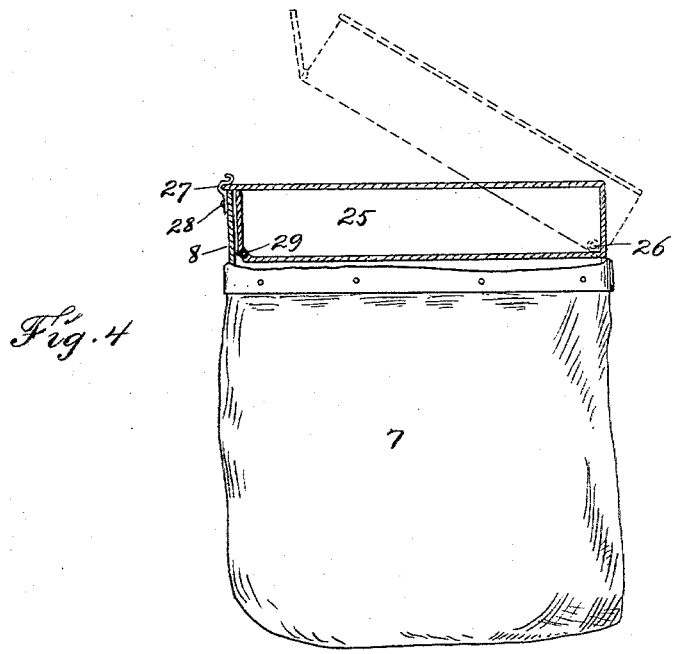

Figure 1 is a sectional side view of the preferred form of our improved tobacco-pouch; Fig. 2, a plan view thereof with part of the construction in section; Fig. 3, a partial section thereof; Fig. 4, a view similar to Fig. 1, showing a modified form of construction; and Fig. 5, a sectional plan view thereof.

In the drawings forming part of this specification the separate parts of our improvement are designated by numerals of reference in each of the views, and in the practice of our invention we provide a tobacco-pouch 7, which may be composed of any suitable flexible material, and in the open end thereof we secure a metal casing 8, which is preferably conical in form, and in the inner side walls of said casing we form longitudinal grooves 9, whereby corresponding longitudinal ribs 10 are formed on the outside of said side walls, and one end of said casing is open and provided at the upper side thereof with inwardly-curved ears or projections 11, and mounted in said casing is a sliding drawer 12, which is provided with side ribs 13, which fit in the grooves 9, and mounted in said drawer and passing through the inner end thereof is a bolt 14, which is adapted to bear on the closed end of the casing 8, and said bolt is provided within the sliding drawer 12 with a pin 15, and the end of said bolt passes through a bearing 16 in said drawer, and between said bearing and said pin is a spiral spring 17, which operates to force the drawer 12 outwardly, and secured transversely of the inner end of the casing 8 and extending upwardly therein is a spring 18, which is provided centrally with a pin 19, which projects outwardly through the side wall of the casing 8, and the sliding drawer 12 is provided at its inner end with a spring-catch 20, which is adapted to pass between the spring 18 and the side wall of the casing 8, and the outer end of the sliding drawer is provided at its lower side with a depending flange 21, and a portion of the top thereof is hinged at 22 and provided with a depending end plate 23, which is adapted to close the end of the sliding drawer, and said sliding drawer is designed to serve as a match box or receptacle.

The hinged portion 24 of the cover or sliding drawer can only be raised when said drawer is projected, as shown in Fig. 1, and when said drawer is in its innermost position the hinged portion 24 of the cover is held close by the ears or projections 11, and the operation will be readily understood from the foregoing description when taken in connection with the accompanying drawings and the following statement thereof.

When the drawer 12 is forced backwardly into the casing 8, the spring-catch 20 engages with the spring 18 and holds said drawer within said casing, and when it is desired to project the drawer the pin 19 is pressed inwardly, the spring-catch 20 is released, and the spring 17 forces the drawer outwardly, as shown in Fig. 1. The bottom of the drawer 12 is also provided near the inner end thereof with a lug 12$^a$, which is intended to prevent the removal thereof, and it will be understood that said drawer is drawn partially out in order to fill the pouch or to remove tobacco therefrom.

Figure 5:
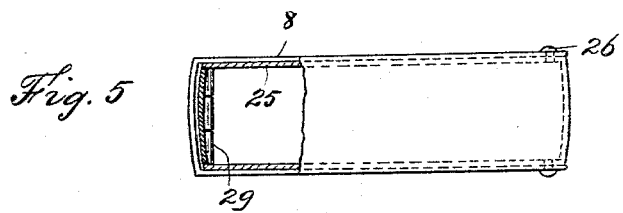

In Figs. 4 and 5 we have shown a modification in which the casing 8 is open at the top and provided with a supplemental casing 25, which is similar in form thereto, and the casing 8 is open at one end, and the supplemental casing 25 is hinged in the open end thereof, as shown at 26, and the top of the supplemental casing 25 projects over the closed end of the casing 8, as shown at 27, and may be provided with a spring-catch or other device 28, and the end of the supplemental casing 25 opposite the hinged connection at 26 is also hinged to the bottom of said casing, as shown at 29, and is adapted to turn outwardly.

The supplemental casing 25 is adapted to serve as a match box or receptacle, and in this form of construction the free end of the supplemental casing must be raised out of the casing 8 in order to place the matches therein or remove the same therefrom, and it will be understood that in both forms of construction the tobacco-pouch 7 is filled and the tobacco removed therefrom through the casing 8.

Having fully described our invention, we claim as new and desire to secure by Letters Patent—

1. A tobacco-pouch which is open at one end and provided with a metal casing in which is mounted a sliding drawer, said drawer being adapted to serve as a match box or receptacle, and said casing being opened by withdrawing said drawer, substantially as shown and described.

2. A tobacco-pouch which is open at one end and provided with an oblong metal casing in which is mounted a sliding drawer, said casing being adapted to be closed by said drawer, and means for securing said drawer within said casing, substantially as shown and described.

3. A tobacco-pouch which is open at one end and provided with an oblong metal casing in which is mounted a sliding drawer, said casing being adapted to be closed by said drawer, and means for securing said drawer within said casing, said drawer being also provided at its outer end with a hinged cover and end piece, substantially as shown and described.

4. A tobacco-pouch which is open at one end and provided with an oblong box or casing in which is mounted a sliding spring-operated drawer, said casing being adapted to be closed by said drawer, and said drawer and said casing being provided with spring-catches whereby the drawer is held in a closed position, substantially as shown and described.

In testimony that we claim the foregoing as our invention we have signed our names, in presence of the subscribing witnesses, this 17th day of May, 1897.

JOEL BARRETT.
JAMES H. WYATT.

Witnesses:
   THOS. A. HYER,
   ADD BURNETT.